United States Patent [19]

Likei

[11] Patent Number: 4,946,185
[45] Date of Patent: Aug. 7, 1990

[54] TOWING DEVICE

[76] Inventor: Arthur Likei, 9265 - 156th Street, Surrey, British Columbia, Canada, V3R 4L1

[21] Appl. No.: 151,613

[22] Filed: Feb. 2, 1988

[30] Foreign Application Priority Data

Feb. 6, 1987 [CA] Canada .................................. 529241

[51] Int. Cl.⁵ ............................................. B60D 1/28
[52] U.S. Cl. ..................................... 280/457; 24/590; 24/572; 59/93; 410/23
[58] Field of Search ................... 280/457, 432, 460 R, 280/480, 500, 505, 511; 410/23, 116; 248/222.2; 59/93; 24/590, 230.5 W, 588

[56] References Cited

U.S. PATENT DOCUMENTS

| 2,322,576 | 6/1943 | Huebshman et al. | 410/23 |
| 2,859,050 | 11/1958 | Stonerock et al. | 280/491 E |
| 3,471,070 | 10/1969 | Olson | 280/505 |
| 3,471,170 | 10/1969 | Rendessy | 280/457 |
| 3,549,173 | 12/1970 | Stanfield | 280/457 |
| 3,675,947 | 7/1972 | Blagg | 280/500 |
| 3,739,432 | 6/1973 | Sander et al. | 24/590 |
| 4,467,598 | 8/1984 | Wells | 280/457 X |

FOREIGN PATENT DOCUMENTS 324554 11/1957 Switzerland ........................ 280/480

Primary Examiner—Mitchell J. Hill
Attorney, Agent, or Firm—Fetherstonhaugh & Co.

[57] ABSTRACT

A tow hitch system comprising a tow bar to be secured to a towing and to a towed vehicle. the towing vehicle includes spaced openings adjacent to the point where the tow bar is secured. There is an anchor point on the tow bar. A chain received at the anchor point. Safety catches at each end of the chain engage the spaced openings. Each safety catch comprises a central limb to be received in an opening. Side limbs extend from each end of the central limb to contact opposed sides of an area of the towing vehicle adjacent the point where the tow bar is secured to maintain the catch in position. The system is easy to make and very easy to use yet safe in use.

7 Claims, 2 Drawing Sheets

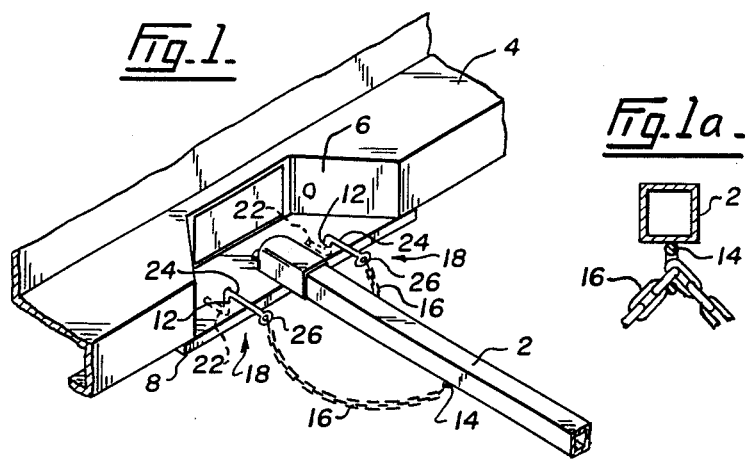
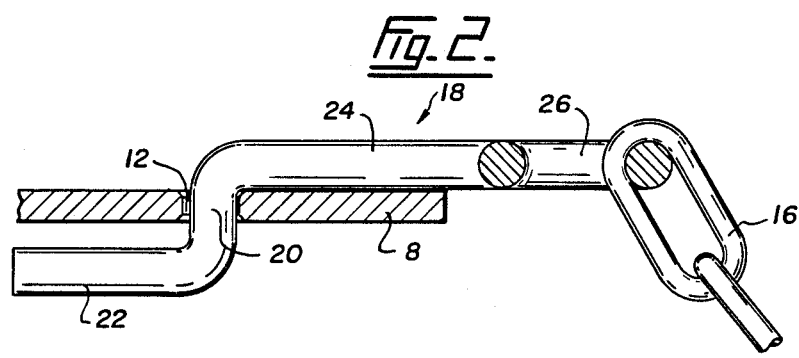
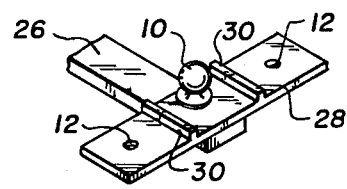

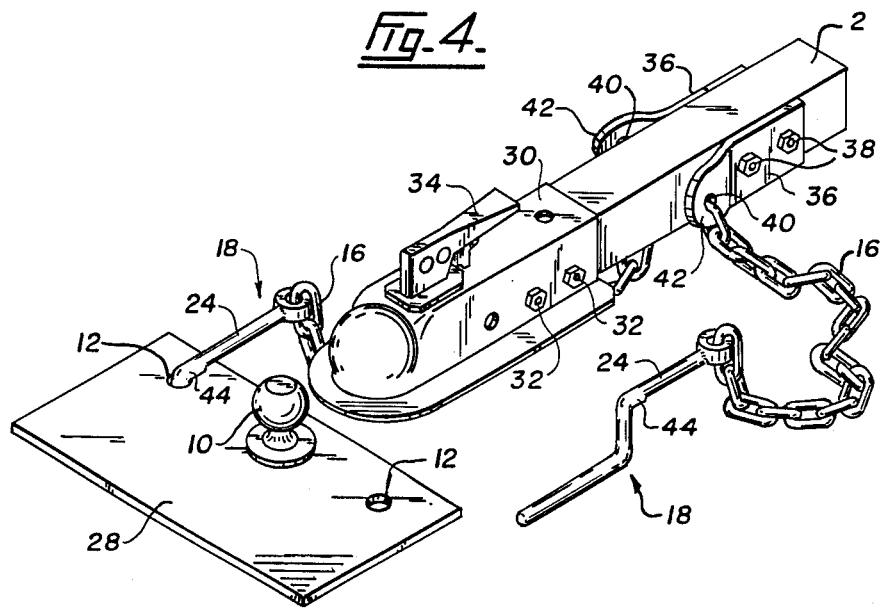

TOWING DEVICE

FIELD OF THE INVENTION

This invention relates to a safety device for a tow bar and to a tow hitch including the safety device.

DESCRIPTION OF THE PRIOR ART

The towing of trailers is well known. It is done by all sizes of vehicles from family sedans towing small camping trailers to large trucks increasing their hauling capacity by towing large trailers.

The towing is carried out by a variety of means including fifth-wheel hitches and tow bars, the latter being generally preferred, certainly with small trailers.

All tow bars must have a safety device. If the bar fails the safety device maintains the tow at least until the vehicle can be stopped. These safety devices take many forms. Examples include those described in U.S. Pat. Nos. 2,712,945 to Peterson; 3,125,355 to Snuggins; 3,464,720 to Abromavage and 3,549,173 to Stanfield.

The above patents indicate clearly that chains are much used in safety devices and the patents feature a variety of methods of attaching these chains. In addition, attention should be directed to U.S. Pat. Nos. 2,322,576 to Huebsham showing a hook structure for use in a tie down device when a vehicle is being lifted. U.S. Pat. No. 4,422,608 to Hogg features a hook, but the hook is lightweight and attaches to a wall, for example for hanging pictures. Hogg is essentially a lightweight structure including a pressure sensitive adhesive to assist in its location on a surface.

SUMMARY OF THE INVENTION

The present invention seeks to provide a safety device for use with a tow hitch system and to provide the tow hitch system. The safety device of the present invention is especially simple to use, easy to manufacture yet effective in use.

Accordingly, in a first aspect the present invention is a tow hitch system comprising a tow bar to be secured to a towing and to a towed vehicle, the towing vehicle including spaced openings adjacent to the point where the tow bar is secured, the improvement comprising an anchor point on the tow bar; a chain to be received at the anchor point; a pair of saffety catches at each end of the chain to engage the spaced openings; each safety catch comprising a central limb to be received in an opening; side limbs extending from each end of the central limb to contact opposed sides of an area of the towing vehicle adjacent the point where the tow bar is secured to maintain the catch in position.

In a further aspect the present invention is a safety device for a tow bar comprising: a chain to be attached to the two bar; a safety catch attached to an end of the chain, the safety catch comprising: a central limb; a side limb extending from each end of the central limb, the central limb being receivable in an opening in a towing vehicle with the side limbs extending to contact the top and bottom of the area surrounding the opening to maintain the catch in position.

Desirably there is a safety catch at each end of the chain. The safety device can attach to the bumper of a small truck, which may be adapted, as necessary, to receive the safety device. In addition, particularly for use with cars, the device may include a plate having a central position to receive a ball joint of a tow hitch and an opening at least one side of the central position so that the safety device of the invention can be attached. Such a plate is attached to a structure of a car in conventional manner for a towing ball joint.

In a preferred aspect the plate has guides to locate the tow bar.

BRIEF DESCRIPTION OF THE DRAWINGS

Aspects of the invention illustrated, merely by way of example, in the accompanying drawings in which:

FIG. 1 is an isometric projection of a tow hitch system according to the present invention;

FIG. 1a is a section view taken through the tow bar showing the anchor point for the chain;

FIG. 2 is a detail, partially in section, of FIG. 1;

FIG. 3 illustrates a detail of a particular embodiment of the invention; and

FIG. 4 illustrates a second embodiment of the invention.

DESCRIPTION OF THE PREFERRED EMBODIMENTS

FIG. 1 shows a tow hitch comprising a tow bar 2, of conventional configuration, secured to a towing vehicle, the rear bumper 4 of the towing vehicle only is shown. The bar 2 is also attached to a towed vehicle in an entirely conventional manner. The towed vehicle is not shown. The illustrated bumper 4 in FIG. 1 is conventional and includes a recess 6 having a plate 8 attached. This recess 6 and plate 8 acts as a step to enter the vehicle or, of course, for the attachment of the tow bar 2. Although not shown in FIG. 1 a ball joint extends through the center of the plate, the ball joint as being shown in FIG. 3 at 10.

There are spaced openings 12 on each side of the ball joint 10. There is an anchor point 14 on the tow bar 2. As shown in FIG. 1a, point 14 is shown as an eye but may simply comprise the welding of safety chain 16 to the tow bar 2. Chain 16 is received at the anchor point 14.

A pair of safety catches 18 are positioned at each end of the chain 16 to engage the openings 12 in the tow plate 8. This is shown particularly in FIG. 2. Each safety catch 18 comprises a central limb 20, to be received in the opening 12. Side limbs 22 and 24 extend from each end of the central limb 20 to contact the top and bottom of the tow plate 8 to maintain the catch 18 in position. The arrangement is shown in FIG. 2.

In the preferred embodiment illustrated there are safety catches 18 at each end of the chain 16. This is much preferred although there may be circumstances where only one safety catch 18 is needed. As indicated in FIGS. 1 and 2, each safety catch 18 is formed with an eye 26 to enable attachment of the chain 16. As shown particularly in FIG. 2 the opening 12 is such that the limb 22 and the limb 20 can be fed through the opening 12. The central limb 20 is then retained in the opening 12.

The device of the present invention is extremely simple to use. In the preferred embodiment, in which the anchor on the tow bar 2 is a simple eye, one safety catch 18 on the chain 16 is fed through the eye. The safety catch 18 is then rearranged generally vertical to the opening 12 pushed downwardly and turned through 90°. It is then loosely held in the opening 12, as shown in FIG. 2, but it cannot be disturbed by simple vibration. It can only be removed by a positive action taken by an individual turning the safety catch through 90° so the lower limb 22 can pass through the opening 12 to release the safety catch from the tow plate. The second safety catch 18 is then engaged in the other opening 12.

As will be appreciated the attachment of these safety catches takes mere seconds.

Thus to attach the safety system it is simply necessary to make the tow hitch in conventional manner, typically by placing bar 2 over the ball joint 10, attaching the trailer, all in conventional manner, and then attaching the safety devices to the openings 12 in the tow plate 8 as described above.

FIG. 3 illustrates a modification to the invention in which conventional ball joint 10 is attached to the frame of a car by a bar 26. A plate 28 extends outwardly from the ball joint 10 and is provided with openings 12 to be engaged by the safety catches 18. In the embodiment of FIG. 3 there are guide surfaces 30 to receive and locate the tow bar these are not essential to the invention.

FIG. 4 shows a currently preferred embodiment of the present invention. The embodiment of FIG. 4 is very similar to the embodiment of FIGS. 1, 2 and, in these circumstances, common reference numerals have been used. In FIG. 4 the tow bar 2 is clearly shown having an end piece 30 that is bolted to the tow bar by nuts and bolts 32. A safety catch 34 is provided. These catches are well known in the art and simply provide a trigger, shown in FIG. 4 attached to a hook, not shown, that engages beneath the lower surface of the ball 10. They are entirely conventional and will not be discussed further here.

There are two major changes in FIG. 4, compared with the embodiment of FIG. 1. The first is the provision of angle plates 36 that are bolted to the bar 2 by nuts and bolts 38. Angle plates 36 are each provided with an opening 40 formed in an end piece 42 inclined outwardly from the main body of the plate 36. This simplifies the attachment of the chains 16 and, for example, eliminates the necessitty for welding and the like in attaching the anchor points for the chains 16.

The second modification is the provision of a thickened portion 44 in each side limb 24 of each bracket 18. These thickened portions act to assist in locating the catches 18 in the openings 12 and, in particular, remove any possibility of the safety catches 18 tipping and moving downwardly through the opening 12.

The present invention may be made of mild steel. Where appropriate heavy-duty material may be used.

I claim:

1. In a tow hitch system comprising:
  a tow bar to be secured to a towing and to a towed vehicle, the towing vehicle including spaced openings adjacent the point where the tow bar is secured, the improvement comprising:
  an anchor point on the tow bar;
  a chain attached to the anchor point at a point intermediate the ends of the chain;
  a pair of safety catches, one of said pair of safety catches at each end of the chain, to engage the spaced openings;
  each safety catch comprising a central limb to be received in an opening and dimensioned for rotatable movement in said opening;
  elongated side limbs extending parallel thereto from each end of the central limb to contact opposed sides of an area of the towing vehicle adjacent the point where the tow bar is secured to maintain the catch in position; and
  an eye at one end of one of said side limbs of each safety catch to receive the chain.

2. A safety device for a tow bar comprising:
  at least one chain attached to the tow bar;
  a safety catch attached to an end of said at least one chain, the safety catch comprising:
  a central limb;
  two elongated side limbs, one of said elongated side limbs extending from each end of the central limb, the central limb being receivable and rotatable in an opening in a towing vehicle with the side limbs extending to contact the top and bottom of the area surrounding the opening to maintain the catch in position.

3. A safety device as claimed in claim 2 in which there is a single chain attached to said tow bar at a point intermediate the ends of the chain with a safety catch at each end of the chain.

4. A safety device as claimed in claim 2 including a plate to be attached to the towing vehicle and having a central ball joint attachment adapted to releasably engage a tow hitch;
  an opening at least one side of said ball joint attachment to receive the safety catch.

5. A safety device as claimed in claim 4 including guides on the plate to locate the tow bar.

6. A safety device as claimed in claim 4 in which there are two openings, one of said openings on each side of the central ball joint attachment.

7. A safety device as claimed in claim 2 having an eye at one end of each side limb to receive the chain.

* * * * *